April 30, 1940. E. WERNER 2,198,894
EDUCATIONAL APPARATUS
Filed June 8, 1938 2 Sheets-Sheet 1
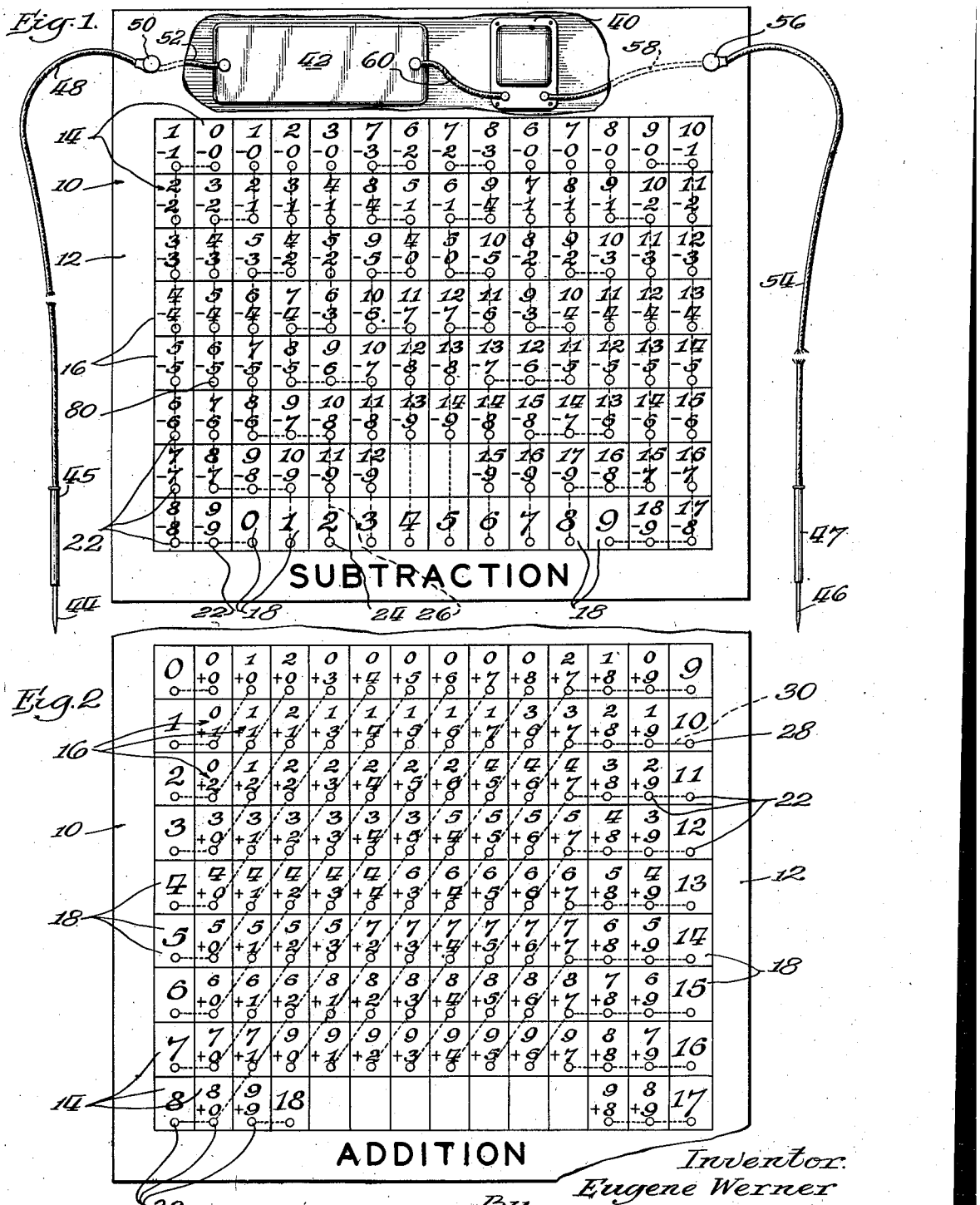
Inventor:
Eugene Werner
By Williams, Bradbury, McCaleb & Hinkle
Attys.

April 30, 1940.    E. WERNER    2,198,894
EDUCATIONAL APPARATUS
Filed June 8, 1938    2 Sheets—Sheet 2
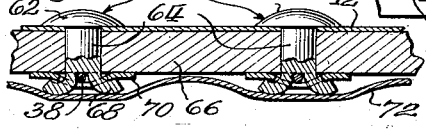
Inventor:
Eugene Werner Patented Apr. 30, 1940

2,198,894

UNITED STATES PATENT OFFICE 2,198,894

EDUCATIONAL APPARATUS

Eugene Werner, Streator, Ill.

Application June 8, 1938, Serial No. 212,408

9 Claims. (Cl. 35—9)

The present invention relates to educational apparatus and particularly to apparatus for teaching mathematics to children.

Numerous devices have been created for the purpose of teaching mathematics to children, particularly smaller children. One of the requisites of these devices is durability so that they are able to withstand the rough usage to which they are subjected and are not likely to become damaged so as to render them useless. A further, and likewise important, requisite is simplicity and economy in manufacture so that the devices may be made available to a maximum number of users at minimum cost.

It is, therefore, the primary purpose of this invention to provide new and improved apparatus of this type that is simple, durable, and which may be made inexpensively.

A more particular object of the present invention is to provide a new and improved educational apparatus comprising a board having a number of question and answer contacts interconnected in predetermined manner by nonintersecting electrical conductors, whereby short circuits and consequent destruction of the board are obviated.

A further object of the invention is to provide such a board with an improved contact structure, whereby the conductors interconnecting the various contacts may be both readily and securely attached to the contacts.

A still further object of the invention is to provide a number of such boards devised to teach children various mathematical processes, such as addition, subtraction, division and multiplication, only one of which boards is provided with the electrical equipment necessary to give the user an indication of the selection of the correct answer for any particular answer.

Other objects and advantages of the present invention will become more apparent from the ensuing description in the course of which, reference is had to the following drawings in which:

Fig. 1 is a plan view, partly in section, of one embodiment of a device constructed in accordance with the invention, this embodiment being a board devised for the purpose of instructing children in subtraction;

Fig. 2 is a similar view of a board devised for the purpose of instructing children in addition;

Fig. 3 is a view similar to Fig. 2 of a board devised for the purpose of teaching children multiplication;

Fig. 4 is a similar view of a board constructed for the purpose of teaching children division; and Fig. 5 is a partial vertical section, taken along the line 5—5 of Fig. 4 and illustrating the new and improved contact structure of the present invention.

According to the present invention, each of the boards 10 comprises an upper layer 12 of suitable material, such as a fairly heavy grade of paper, on the surface of which is printed a series of substantially equal-sized rectangles 14. These rectangles contain the various numbers to be added, subtracted, multiplied, or divided, which may be termed the questions, and also the results of the specified processes, which may be termed the answers. The squares containing the questions are indicated by reference numerals 16, and if reference is had to the various figures, it may be seen that each of these squares contains two numerals and an indication of the process to be performed. The rectangles containing the answers are indicated specifically by reference numerals 18, and upon reference to the various figures it may be seen that each of these rectangles contains but a single number. The advantages of the present invention may be realized irrespective of the number of rectangles, although for the purpose of illustration, the various boards have been shown provided with a number of rectangles sufficient to illustrate the mathematical processes of addition, subtraction, multiplication and division with the integers 0 to 9, inclusive.

Each rectangle, containing either a question or answer, is provided with a contact 22 and these contacts are so interconnected by single-branch conductors that the contacts in rectangles containing questions having identical answers are connected to a single contact in a rectangle containing an answer. The connections of the contacts for the various embodiments are believed clearly to be discernible from a study of the various figures and, consequently, it is not believed that a detailed consideration of all the connections is either necessary or desirable. However, in order that there may be no doubt as to the construction or mode of operation, a single conductor of each board is traced.

To illustrate the construction of the subtraction board of Fig. 1, the connection of the contact 24 in the rectangle containing the answer 2 may be noted which rectangle is located at the outer edge of that portion of the surface of the board divided into rectangles. This contact is connected by a single conductor 26 to a plurality of contacts, all located in rectangles containing numbers which, when the smaller is subtracted from the larger, result in an answer of 2. The remaining rectangles are connected in similar manner.

In the addition board of Fig. 2, the contact 28 is located in the rectangle containing the answer 10. A conductor 30 leads from this contact to a number of contacts, all located in rectangles containing numbers which, when added together, give 10 as the result.

The multiplication board of Fig. 3 is similarly arranged. The contact 32 in the rectangle containing the answer 8 is connected by a single conductor 34 to a plurality of contacts, all of which are located in rectangles containing numbers which, when mutliplied together, result in the answer 8.

In the division board of Fig. 4 the contact 36 in the rectangle containing the answer 2 is connected by a conductor 38 to a plurality of contacts, all located in rectangles containing two numbers which, when one is divided into the other, result in the answer 2. In this board, as in the others, the rectangles containing the answers are located at the outer edge of that portion of the surface of the board divided into rectangles.

Reviewing the construction of the boards, as a whole, it may be seen that the conductors are arranged in a certain symmetrical fashion whereby no two conductors intersect or, expressed in other language, the conductors may be thought of as being coplanar and laterally spaced apart, and a minimum of wire is required. This construction is one of the important features of the present invention because short circuits are avoided and the boards may be fabricated simply, easily and economically.

In order to give the child using the apparatus thus far described an indication of the correctness of the answer for any selected question, the various boards may be provided with visual indicating means. However, in accordance with the present invention and in order to render a complete set of four boards to be constructed at a minimum cost, only one of them is provided with indicating means. This means is so constructed and arranged that it may be used with the remaining boards.

Accordingly, the subtraction board of Fig. 1 is provided with an audible indicating means 40, such as an electrically operated buzzer, which is adapted to be connected to a source of electrical energy, such as a battery 42. If desired, energy may be supplied to the buzzer from any other source, such as from a 110 volt AC line through a suitable transformer. When the pointers 44 and 46, having insulated handles 45 and 47, respectively, are placed in contact with a pair of interconnected contacts, the pointer 44 is connected by a flexible conductor 48 to a terminal 50 at the upper end of the board and the latter is, in turn, connected by a conductor 52 to one terminal of the battery 42. The other pointer 46 is connected by a flexible conductor 54 to a second terminal 56, which is, in turn, connected by a conductor 58 to the buzzer 40. The circuit to the buzzer is completed by a conductor 60, leading directly from the buzzer to the battery.

The battery, buzzer and the conductors interconnecting these to each other and to the terminals 50 and 56 may be enclosed, as illustrated in Fig. 1, or if desired, they may be placed on the surface of the boards. It is preferable to enclose them in suitable manner, particularly in view of the fact that neither the battery nor the buzzer needs to be very large.

Before proceeding with a description of the mode of operation, it may be well to refer to the novel contact construction of the present invention. If reference is had to Fig. 5 it may be seen that the contacts 22 each comprises a rounded head 62, and a body portion 64 extending through the cardboard or like material 66, comprising the main portion of the board. The contact terminates in a split end comprising spaced-apart terminal portions 68 between which the conductor extends. After the conductor has been threaded through the split end, a washer 70 is placed thereover and thereafter the split end is peened to produce the final structure illustrated in Fig. 5. In order further to protect against injury to the wires or shock to the users of the boards, the under surface may be covered by a protective layer of thin insulating material 72, such as cloth or paper.

In the description of the operation, reference is had first to Fig. 1. In use, the user will first place one of the pointers, say pointer 44 upon the contact in the rectangle containing the numbers to be subtracted. Suppose that pointer 44 is placed on the contact 80 in the rectangle containing the indication 7 minus 5. If the user knows the answer, the other pointer 46 will be immediately placed upon the contact 24, which is in the rectangle containing the answer 2. Thereupon a circuit is completed from the battery to the buzzer through a circuit including conductor 26, the selected contacts, and the two pointers.

From the above it should be fairly apparent that if the correct answer was not known to the user, then the pointer 46 is moved over the various answer contacts until an audible indication is given indicating that the pointer is upon the contact in the rectangle containing the correct answer.

If the user desires to use the addition board, then this board is adapted to be placed adjacent the subtraction board, or, preferably, directly over the latter. Then the same pointer, buzzer and source of electrical energy may be used with the addition board. Likewise, the same electrical apparatus may be used with the multiplication and division boards.

It should be understood by those skilled in the art that instead of using a buzzer to give an audible indication, a light may be substituted for it so as to give the user a visible indication. Other changes and modifications may be made in the specific embodiments that have been described and illustrated herein without departing from the spirit of the invention.

Having thus described the invention, what I claim and desire to secure by Letters Patent is:

1. An arithmetical educational apparatus, including in combination, a board having a portion of its surface subdivided into spaces indicating questions and answers, the spaces indicating answers being located at the outer edge of said portion of the surface, electrical contacts associated therewith connected by laterally spaced apart conductors, a source of energy, signal means and means including manually manipulatable members for completing circuits through said source, signal means and connected contacts.

2. An arithmetical educational apparatus, including in combination, a board having a portion of its surface subdivided into a plurality of spaces, certain of said spaces having questions indicated therein and others answers, the spaces indicating answers being located at the outer edge of said portion of the surface and certain of said questions having the same answer, contacts in said spaces, and substantially coplanar conductors spaced apart from each other for connecting the contacts in the question spaces to their respective answer contacts.

3. An arithmetical educational apparatus, including in combination, a board having a portion of its surface subdivided into a plurality of spaces, certain of said spaces having questions indicated therein, and others answers, the spaces indicating answers being located at the outer edge of said portion of the surface, a plurality of said questions having the same answer, a contact in each of said spaces, substantially coplanar single-branch conductors adjacent one side of the board and spaced apart from each other for connecting the contacts in the question spaces to their respective answer contacts, a source of energy, signal means, and pointer means for completing a circuit through said source, signal means, and interconnected question and answer contacts.

4. In apparatus of the type comprising a board having question and answer contacts interconnected in predetermined manner by conductors, a contact comprising a headed rivet having a split end through which the conductor passes, means surrounding the rivet and placed over the conductor, said split end being peened to hold the last mentioned means and conductor securely in place.

5. In apparatus of the type comprising a board having questions and answer contacts interconnected in a predetermined manner by conductors, a contact comprising a headed rivet having a split end through which the conductor passes, and a metallic washer adapted to fit closely about the end of the rivet and to bear against the conductor, said split end being peened securely to hold the washer and conductor in place.

6. In apparatus of the type comprising a board of a certain thickness having question and answer contacts interconnected in a predetermined manner by conductors, a contact comprising a headed rivet having a body portion and split end through which the conductor passes, said body portion being of a length substantially equal to the thickness of the board, a metallic washer adapted to fit closely about the end of the rivet and to bear against the conductor, said split end being peened securely to hold the washer and conductor in place.

7. Apparatus of the type comprising a board having inter-connected arithmetical question and corresponding answer contacts adapted to be connected in circuit with a source of energy and signal means, characterized by connection of the contacts by co-planar laterally spaced apart connections, whereby cross-overs between contact connections are avoided.

8. An apparatus of the type comprising interconnected question and answer contacts, in which the question contacts are associated with an arithmetical table from zero to nine, and the answer contacts are the corresponding answers for the table, and the contacts are adapted to be connected in circuit with a source of energy and signal means, characterized by location of the contacts associated with the answers at the outer edge of the group of contacts and connection of the contacts by laterally spaced apart conductors, whereby cross-overs between the conductors are eliminated.

9. For use with educational apparatus comprising a plurality of boards of predetermined size and of the type having their surfaces subdivided into a plurality of spaces, certain of which contain questions and others answers, said spaces having contacts electrically connected in predetermined manner, a board having a portion of its surface substantially equal in size to said boards similarly subdivided into marked spaces having contacts connected in predetermined manner, a source of energy, a signal and manually manipulatable means for connecting said source and signal in series through interconnected contacts, said manually manipulatable means, source of energy and signal being mounted upon said last mentioned board beyond the subdivided portion of its surface so that the manipulatable means, source of energy and signal may be used with all said boards.

EUGENE WERNER.